(12) United States Patent
Fattal et al.

(10) Patent No.: US 12,418,641 B2
(45) Date of Patent: Sep. 16, 2025

(54) MULTIVIEW IMAGE CAPTURE SYSTEM AND METHOD

(71) Applicant: LEIA INC., Menlo Park, CA (US)

(72) Inventors: David A. Fattal, Mountain View, CA (US); Selim Cayligil, New York City, NY (US)

(73) Assignee: LEIA Inc., Menlo Park, CA (US)

( * ) Notice: Subject to any disclaimer, the term of this patent is extended or adjusted under 35 U.S.C. 154(b) by 99 days.

(21) Appl. No.: 18/414,412

(22) Filed: Jan. 16, 2024

(65) Prior Publication Data

US 2024/0155098 A1 May 9, 2024

Related U.S. Application Data

(63) Continuation of application No. PCT/US2021/047669, filed on Aug. 26, 2021.

(51) Int. Cl.
*H04N 13/282* (2018.01)
*H04N 13/271* (2018.01)
*H04N 23/90* (2023.01)

(52) U.S. Cl.
CPC ......... *H04N 13/282* (2018.05); *H04N 13/271* (2018.05); *H04N 23/90* (2023.01)

(58) Field of Classification Search
CPC .... H04N 13/282; H04N 13/271; H04N 23/90; H04N 13/161; H04N 13/243; H04N 13/275; H04N 13/128
See application file for complete search history.

(56) References Cited

U.S. PATENT DOCUMENTS

| | | | |
|---|---|---|---|
| 9,123,172 B2 * | 9/2015 | Sebring | H04N 23/51 |
| 9,466,109 B1 * | 10/2016 | Adsumilli | G06T 7/30 |
| 9,813,610 B2 * | 11/2017 | Anderson | H04N 7/181 |
| 2005/0104999 A1 | 5/2005 | Wada et al. | |
| 2012/0113232 A1 | 5/2012 | Joblove | |

(Continued)

FOREIGN PATENT DOCUMENTS

| | | |
|---|---|---|
| JP | 2004088247 | 3/2004 |
| JP | 2008096721 | 4/2008 |

(Continued)

OTHER PUBLICATIONS

International Search Report and Written Opinion (ISRWO) from the International Searching Authority (ISA/KR) dated May 18, 2022 (10 pages) for counterpart parent PCT Application No. PCT/US2021/047669.

(Continued)

*Primary Examiner* — Fernando Alcon
(74) *Attorney, Agent, or Firm* — Schwegman, Lundberg & Woessner, P.A.

(57) ABSTRACT

Systems and methods are directed to a camera system configured to capture a multiview image of an object along an arc. Each camera in the camera system may correspond to a common field of view. In addition, a computing system coupled to the camera system may calculate a target camera baseline based on a first value and a second value, and dynamically adjust an inter-camera capture distance to match the target camera baseline. The first value may indicate the common field of view and the second value may indicate a distance between the camera system and the object.

20 Claims, 10 Drawing Sheets

(56) References Cited

U.S. PATENT DOCUMENTS

| | | | | |
|---|---|---|---|---|
| 2014/0341484 | A1* | 11/2014 | Sebring | H04N 23/661 |
| | | | | 382/284 |
| 2016/0100154 | A1* | 4/2016 | Ghyme | H04N 13/246 |
| | | | | 211/1.51 |
| 2017/0295359 | A1* | 10/2017 | Cabral | H04N 13/156 |
| 2017/0329037 | A1 | 11/2017 | Zhou et al. | |
| 2018/0165875 | A1 | 6/2018 | Yu et al. | |
| 2018/0205929 | A1 | 7/2018 | Fattal | |
| 2018/0234627 | A1* | 8/2018 | Kim | H04N 23/66 |
| 2019/0191146 | A1* | 6/2019 | Koyama | H04N 5/222 |
| 2019/0369613 | A1 | 12/2019 | Moon et al. | |
| 2020/0228782 | A1 | 7/2020 | Fattal | |
| 2022/0321855 | A1* | 10/2022 | Aizawa | H04N 23/90 |
| 2022/0383585 | A1* | 12/2022 | Lee | G06T 15/08 |
| 2024/0013432 | A1* | 1/2024 | Zhou | H04N 17/002 |

FOREIGN PATENT DOCUMENTS

| | | |
|---|---|---|
| JP | 2008217243 | 9/2008 |
| JP | 2010154052 | 7/2010 |
| JP | 2011227613 | 11/2011 |
| JP | 2019004229 | 1/2019 |
| JP | 2019020554 | 2/2019 |
| JP | 2024534103 | 9/2024 |
| KR | 101418167 | 7/2014 |
| KR | 20180074325 | 7/2018 |
| KR | 20180094554 A | 8/2018 |

OTHER PUBLICATIONS

"Japanese Application Serial No. 2024-510626, Notification of Reasons for Refusal mailed Mar. 11, 2025", w English translation, 12 pgs.

"European Application Serial No. 21955229.6, Extended European Search Report mailed Apr. 8, 2025", 10 pgs.

"Korean Application Serial No. 10-2024-7005687, Notice of Preliminary Rejection mailed Mar. 31, 2025", W English Translation, 15 pgs.

Naoto, Matsubara, "VR interface for multi-view-camera lay out planning in a large-scale space", Correspondences on Human Interface, Human Interface Society, (Nov. 2, 2020), 115-120.

* cited by examiner

MULTIVIEW IMAGE CAPTURE SYSTEM AND METHOD

CROSS-REFERENCE TO RELATED APPLICATIONS

This application is a continuation patent application of and claims priority to International Patent Application No. PCT/US2021/047669, filed Aug. 26, 2021, the entire contents of which are herein incorporated by reference.

BACKGROUND

Multiview displays are an emerging display technology that provide a more immersive viewing experience compared to conventional 2D content. Multiview content may include still images or a series of video frames, where each multiview image (e.g., picture or frame) contains different views of a scene. A multiview image may be made up of different view images that correspond to different perspectives of a scene. The different view images may be captured by one or more cameras or may be synthesized such that they are extrapolated or interpolated from other view images.

STATEMENT REGARDING FEDERALLY SPONSORED RESEARCH OR DEVELOPMENT

N/A

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide techniques to capture a scene as one or more multiview images. When capturing multiview images, techniques involve optimizing the capture process to achieve a target display level for a target multiview display. Specifically, a multiview display may be designed such that it renders multiview images at a particular disparity level. The angular range of the views presented by the multiview display may define the preferred disparity level permitted by the multiview display. To generate multiview content that is tailored for the disparity level of a target multiview display, the multiview camera system may dynamically adjust an inter-camera capture distance between cameras of a subset of cameras to match a target camera baseline, where the target baseline provides the predetermined disparity level for rendered multiview images.

In some embodiments, photographers may adjust various visual parameters (e.g., field of view, zoom, camera position, distance between the camera system and object, etc.) and in response, a target camera baseline is calculated and dynamically applied by the camera system to change an inter-camera capture distance between cameras of the camera system. For example, as a photographer provides an input to cause the cameras of the camera system to zoom in or out of a captured object, the inter-camera capture distance dynamically changes to achieve a target camera baseline that matches an optimal disparity level of a multiview display. Some embodiments use a plurality of cameras that change the inter-camera capture distance dynamically. Other embodiments are directed to a single camera that orbits an object and captures images of the object at different locations or from different perspectives to generate a multiview image. The single camera may be an unmanned aerial vehicle (e.g., a drone). The inter-camera capture distance may be dynamically adjusted by determining a timestamp interval for each captured image as the images are captured by the single camera.

The captured multiview content (i.e., images of a set of images that make up a multiview image) may be stored or it may be streamed for rendering in real time on a target multiview display. As used herein, "real time' is defined as the time it takes for a system to process inputs and produce an output. For example, storing data solely for the purpose of processing the data at later point in time is not real time. As noted above, the camera baseline of the multiview content is optimized for a preferred (e.g., typical or ideal) disparity level permitted by the receiving multiview display.

Figure 1:
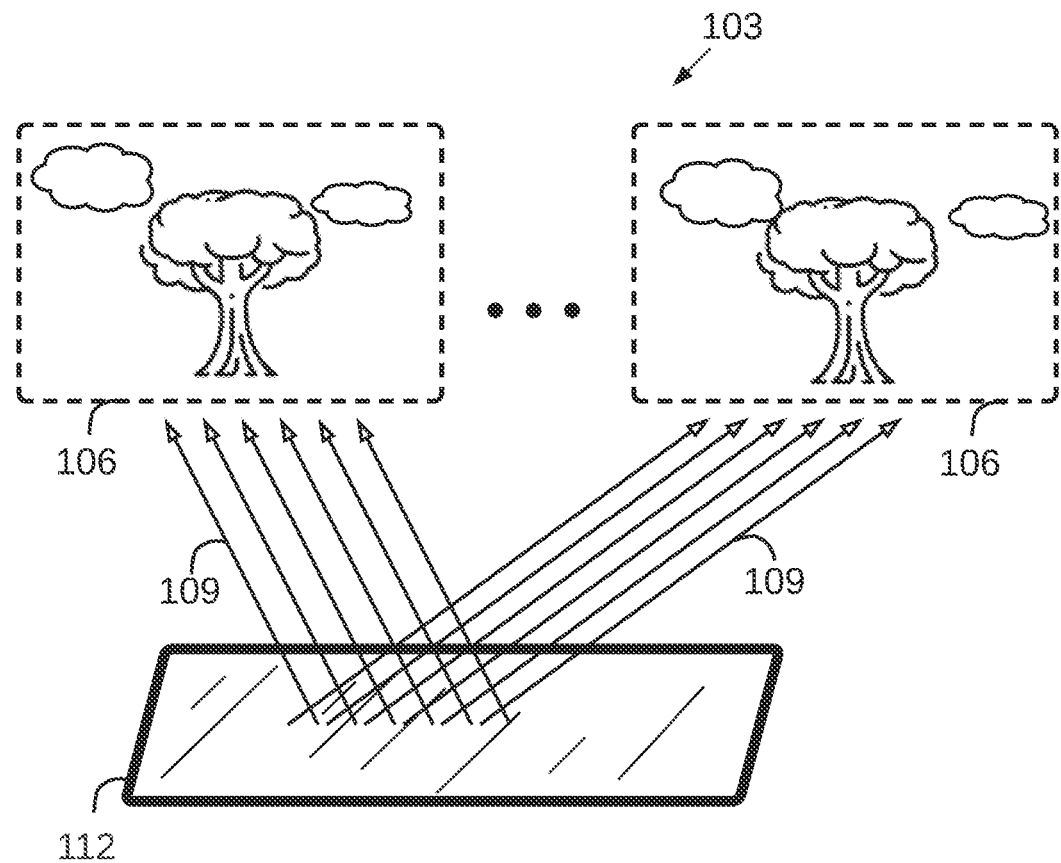
FIG. 1 illustrates a multiview image in an example, according to an embodiment consistent with the principles described herein.

FIG. 1 illustrates a multiview image in an example, according to an embodiment consistent with the principles described herein. A multiview image 103 may be a static picture or a video frame from a multiview video stream. The multiview image 103 comprises a plurality of view images 106 (e.g., views). Each of the view images 106 of the view image plurality corresponds to a view of a scene or object from a plurality of different principle angular directions 109 (e.g., a left view, a right view, etc.). The view images 106 are rendered on a multiview display 112. Each view image 106 represents a different viewing angle of the scene or object within of the multiview image 103. The different view images 106 therefore have some level of disparity with respect to one another. A viewer may perceive one view image 106 with her right eye while perceiving a different view image 106 with her left eye. This allows a viewer to perceive different view images 106 contemporaneously, thereby experiencing a three-dimensional (3D) effect. The multiview display 112 may accommodate a maximum or desired disparity level which may be defined as a percentage of the display width between neighboring views. For example, a multiview display 112 may have a predetermined disparity level of about one percent. In other examples, the predetermined disparity level may be less than one percent (e.g., a quarter of a percent to one percent) or may be higher than one percent (e.g., one percent to ten percent). The predetermined disparity level may also be defined in terms of a number of pixels that create disparity between views. For example, if a multiview display is one thousand pixels wide and it able to present views with about ten pixels of disparity, then the multiview display has a predetermined disparity level of about one percent, which is the pixel distance of disparity relative to the pixel distance of the multiview display.

In some embodiments, as a viewer physically changes her viewing angle with respect to the multiview display 112, the eyes of the viewer may catch different views of the multiview image 103. As a result, the viewer may interact with the multiview display 112 to see different view images 106 of the multiview image 103. For example, as the viewer moves to the left, the viewer may see more of the left side of the scene in the multiview image 103. The multiview image 103 may have multiple view images 106 along a horizontal plane or have multiple view images 106 along the vertical plane, or both. Thus, as a user changes the viewing angle to see different view images 106, the viewer may gain additional visual details of the scene expressed in the multiview image 103.

As discussed above, each view image 106 is presented by the multiview display 112 at different, corresponding principal angular directions 109. When presenting the multiview image 103 for display, the view images 106 may actually appear on or in a vicinity of the multiview display 112. In this respect, rendered multiview content may be referred to as a lightfield content. A characteristic of observing lightfield content is the ability to contemporaneously observe different views. Lightfield content contains visual imagery that may appear in front of the screen as well as behind the screen to convey a sense of depth to the viewer.

A 2D display may be substantially similar to the multiview display 112, except that the 2D display is generally configured to provide a single view (e.g., only one of the views) as opposed to the different views of the multiview image 103. Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions contemporaneously from the perspective of the user. In particular, the different view images 106 may represent different perspective views of a multiview image 103.

The multiview display 112 may be implemented using a variety of technologies that accommodate the presentation of different image views so that they are perceived contemporaneously. An example of a multiview display is one that employs multibeam elements to scatter light in controlled principle angular directions corresponding to view directions of the different view images 106. According to some embodiments, the multiview display 112 may be a lightfield display, which is one that presents a plurality of light beams of different colors and different directions corresponding to different views. In some examples, the lightfield display is a so-called 'glasses free' three-dimensional (3-D) display that may use multibeam elements (e.g., diffractive gratings) to provide autostereoscopic representations of multiview images without the need to wear special eyewear to perceive depth.

Figure 2:
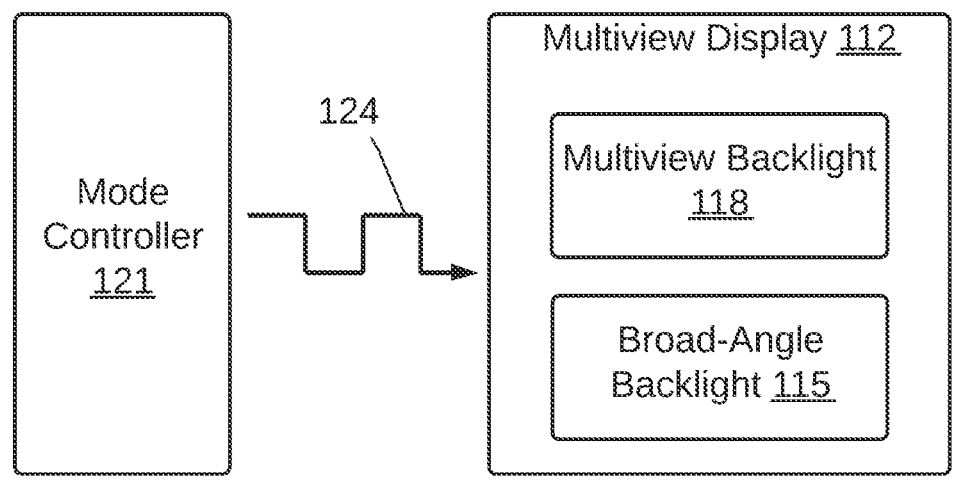
FIG. 2 illustrates an example of a multiview display, according to an embodiment consistent with the principles described herein.

FIG. 2 illustrates an example of a multiview display, according to an embodiment consistent with the principles described herein. A multiview display 112 may generate multiview content when operating in a multiview mode. In some embodiments, the multiview display 112 renders multiview images as well as 2D images depending on its mode of operation. For example, the multiview display 112 may include a plurality of backlights to operate in different modes. The multiview display 112 may be configured to provide broad-angle emitted light during a 2D mode using a broad-angle backlight 115. In addition, the multiview display 112 may be configured to provide directional emitted light during a multiview mode using a multiview backlight 118 having an array of multibeam elements, the directional emitted light comprising a plurality of directional light beams provided by each multibeam element of the multibeam element array. In some embodiments, the multiview display 112 may be configured to time multiplex the 2D mode and the multiview mode using a mode controller 121 to sequentially activate the broad-angle backlight 115 during a first sequential time interval corresponding to the 2D mode and the multiview backlight 118 during a second sequential time interval corresponding to the multiview mode. Directions of directional light beams of the directional light beam may correspond to different view directions of a multiview image 103. The mode controller 121 may generate a mode selection signal 124 to activate the broad-angle backlight 115 or multiview backlight 118.

In 2D mode, the broad-angle backlight 115 may be used to generate images so that the multiview display 112 operates like a 2D display. By definition, 'broad-angle' emitted light is defined as light having a cone angle that is greater than a cone angle of the view of a multiview image or multiview display. In particular, in some embodiments, the broad-angle emitted light may have a cone angle that is greater than about twenty degrees (e.g., >±20°). In other embodiments, the broad-angle emitted light cone angle may be greater than about thirty degrees (e.g., >±30°), or greater than about forty degrees (e.g., >+40°), or greater than fifty degrees (e.g., >+50°). For example, the cone angle of the broad-angle emitted light may be about sixty degrees (e.g., >+60°).

The multiview mode may use a multiview backlight 118 instead of a broad-angle backlight 115. The multiview backlight 118 may have an array of multibeam elements on a top surface, a bottom surface, or between the top and bottom surface of the multiview backlight 118. The multibeam elements are configured to scatter light as a plurality of directional light beams having principal angular directions that differ from one another. Moreover, directional light beams of the directional light beam plurality have directions that correspond to view directions of the multiview display 112 or equivalently of a multiview image displayed by the multiview display 112 during the multiview mode. For example, if the multiview display 112 operates in a multiview mode to display a multiview image having four views, the multiview backlight 118 may scatter out light comprising four directional light beams, each directional light beam corresponding to a different one of the four views. A mode controller 121 may sequentially switch between 2D mode and multiview mode so that a multiview image is displayed in a first sequential time interval using the multiview backlight and a 2D image is displayed in a second sequential time interval using the broad-angle backlight. The directional light beams may be at predetermined angles, where each directional light beam corresponds to a different view of the multiview image.

In some embodiments, each of the backlights (i.e., the broad-angle backlight 115 and the multiview backlight 118) of the multiview display 112 is configured to guide light in a light guide as guided light. That is, one or both of the broad-angle backlight 115 and the multiview backlight 118 may comprise a light guide configured to guide light as the guided light. Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide. The light guide may be shaped like a plate or slab. The light guide may be edge lit by a light source (e.g., light emitting device).

As described above, the multiview backlight 118 of the multiview display 112 is configured to scatter out a portion of the guided light as the directional emitted light using multibeam elements of the multibeam element array, each multibeam element of the multibeam element array comprising one or more of a diffraction grating, a micro-refractive element, and a micro-reflective element. In some embodiments, a diffraction grating of a multibeam element may comprise a plurality of individual sub-gratings, a micro-refractive element may comprise a plurality of individual refractive sub-elements, and a micro-reflective element may comprise a plurality of individual sub-reflectors or reflective sub-elements. According to various embodiments, the multibeam element comprising a diffraction grating is configured to diffractively couple or scatter out the guided light portion as the plurality of directional light beams. According to various embodiments, the micro-reflective element is configured to reflectively couple or scatter out the guided light portion as the plurality of directional light beams. The micro-reflective element may comprise a reflective coating to control the manner in which the guided light is scattered out of the light guide. According to various, the micro-refractive element is configured to couple or scatter out the guided light portion as the plurality of directional light beams by or using refraction (i.e., refractively scatter out the guided light portion).

The multiview display 112 may also include a light valve array positioned above the backlights (e.g., above the broad-angle backlight 115 and above the multiview backlight 118). The light valves of the light valve array may be, for example, liquid crystal light valves, electrophoretic light valves, light valves based on or employing electrowetting, or any combination thereof. When operating in 2D mode, the broad-angle backlight 115 emits light towards the light valve array. Each light valve is controlled to achieve a particular pixel valve to display a 2D image as it is illuminated by broad-angle light emitted by the broad-angle backlight 115. In this respect, each light valve corresponds to a single pixel. A single pixel, in this respect, may include different color pixels (e.g., red, green blue) that make up a single pixel cell (e.g., LCD cell).

When operating in multiview mode, the multiview backlight 118 emits directional light beams (e.g., as a lightfield) to illuminate the light valve array. Light valves may be grouped together to form a multiview pixel. For example, in a four-view multiview format, a multiview pixel may comprise four different pixels, each corresponding to a different view. Each pixel in a multiview pixel may further comprise different color pixels.

Each light valve in a multiview pixel arrangement may be illuminated by one of the directional light beams of the directional light beam plurality having a principle angular direction. Thus, a multiview pixel is a pixel grouping that represents different pixels in different views of a multiview image. In some embodiments, each multibeam element of the multiview backlight 118 corresponds to a multiview pixel of the light valve array.

The multiview display 112 provides a screen to display a multiview image 103. The screen may be a display screen of a telephone (e.g., mobile telephone, smart phone, etc.), a tablet computer, a laptop computer, a computer monitor of a desktop computer, a camera display, or an electronic display of substantially any other device, for example.

As used herein, the article 'a' is intended to have its ordinary meaning in the patent arts, namely 'one or more'. For example, 'a processor' means one or more processor and as such, 'the processor' means 'one or more processors' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

As used herein, the term 'field of view' (FoV) is defined to mean an angular range that a camera can observe through its lens. The FoV may be defined in terms of an angle that forms a cone of light that is permitted to enter a camera lens. For example, cameras with wide angle lenses may have a FoV ranging from 65°-95° while cameras with telephoto lenses may have narrow a narrow FoV ranging from 10°-30°.

Figure 3A:
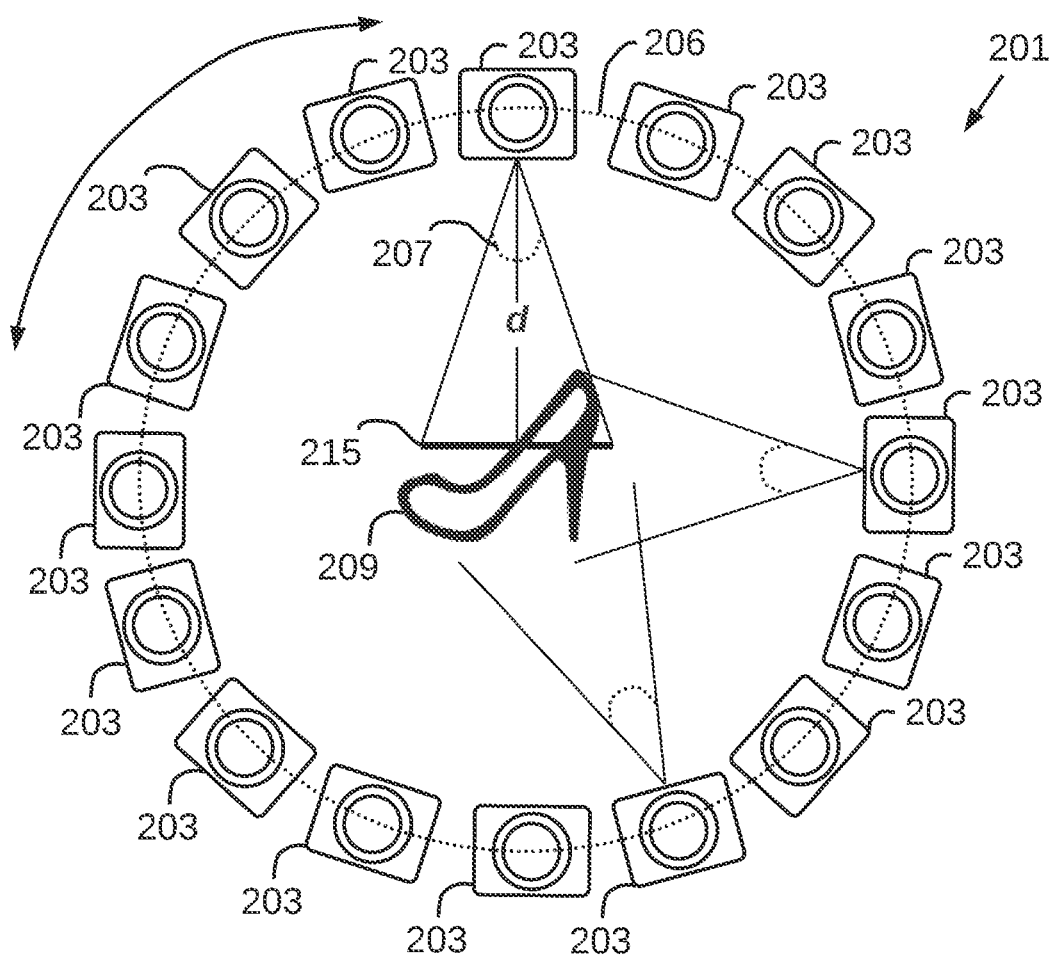
FIG. 3A illustrates a multiview image capture system that includes a plurality of cameras shown from a top-down view, according to an embodiment consistent with the principles described herein.

FIG. 3A illustrates a multiview image capture system that includes a plurality of cameras shown from a top-down view, according to an embodiment consistent with the principles described herein. In some embodiments, the multiview image capture system comprises a camera system 201 comprising a plurality of cameras 203 arranged along an arc 206, the plurality of cameras 203 having a coplanar orientation, each camera 203 having a common field of view (FoV) 207, wherein the camera system 201 is configured to capture image data of an object 209 located at a common distance 'd' away from each of the cameras 203. The image data includes a multiview image, where the multiview image comprises a plurality of different view images of the object. A camera 203 is a device that coverts light received through a lens from an object 209 into an image, which may be a digital representation of the object based on the position, orientation, and configuration of the camera 203.

Cameras 203 are positioned along an arc 206. The arc 206 may be circular or partially circular so that the cameras 203 are similar in distance 'd' away from the object 209. That is, the distance d may be a radius of the arc 206. It should be appreciated that some degree of tolerance is permitted such that the distance 'd' between that the object 209 and each camera 203 is substantially similar such that the ultimate multiview image quality is not compromised.

In addition, the cameras 203 may have a coplanar orientation. By positioning the cameras 203 in a coplanar orientation, each camera is positioned along the same plane while having its field of view (FoV) along the same plane. In this manner, cameras 203 that are diametrically opposed are pointed towards each other. Cameras pointing in different planes are not coplanar. For example, a ring of cameras aimed downwards or upwards is not a coplanar orientation.

Each camera 203 may have a common FoV 207. In this respect, each camera 203 may have the same type of lens or same lens configuration to permit the same angular range of light to enter the lens of each camera 203. The FoV 207 may be adjusted by zooming in or zooming out. By configuring all cameras 203 to have a common FoV 207, user input to zoom in, zoom out, or otherwise change the FoV 207 causes each camera 203 to globally change its FoV 207. Thus, each camera 203 may adopt the same FoV 207 dynamically in response to user input. The FoV 207 translates into a focal length, where the focal length is expressed as a percentage of the recorded plane width. The focal length f may be determined according to equation (1) as:

$$f[\%] = \left[2 * \tan\left(\frac{FoV}{2}\right)\right]^{-1} \quad (1)$$

Where the focal length f is expressed as a percentage of the recorded plane width and FoV in equation (1) is the FoV 207, which may be the same for each camera 203. While FoV is generally employed herein to calculate an inter-camera capture distance, in view of equation (1) either the FoV or the focal length may be used without going beyond the scope of the principles described herein.

The camera system 201 may be configured to capture image data of an object 209 located at a common distance d away from each of the cameras 203. The object 209 may range in sizes from small items (e.g., a shoe, a watch) to larger items (e.g., a car, a building). In some embodiments, the cameras 203 may move along the arc 206 in unison. In this respect, the cameras 203 may orbit around the object 209 to capture different perspectives of the object 209. Each camera 203 may be configured to have the focal plane 215 of the camera 203 fall on the object such that each camera 203 is focused on the object 209, having the same focal length f.

In some embodiments, each camera 203 is attached to a rotatable support member. The rotatable support member is configured to cause the plurality of cameras 203 to uniformly orbit along the arc 206 around the object 209. FIG. 3A shows a bidirectional curved arrow showing how the cameras 203 may rotate around the object 209 in unison while maintaining a consistent gap (e.g., camera baseline) between each camera 203. Each camera 203 may be rigidly fixed to the rotatable support member, where the rotatable support member is shaped like a rigid ring. The rotatable support member may have a track to allow each camera 203 to uniformly glide along a rotational axis created by the rotatable support member. A photographer may provide user input to control the speed and direction of the rotation to allow the cameras 203 to orbit around the object 209.

Figure 3B:
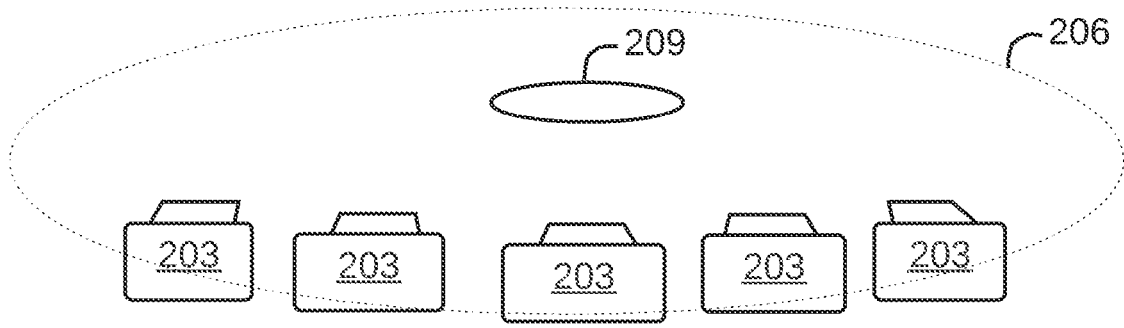
FIG. 3B illustrates a multiview image capture system that includes a plurality of cameras shown from a side view, according to an embodiment consistent with the principles described herein.

FIG. 3B illustrates a multiview image capture system that includes a plurality of cameras shown from a side view, according to an embodiment consistent with the principles described herein. FIG. 3B shows how the different cameras 203 are positioned along an arc 206 and arranged in a coplanar orientation to capture multiview images of the object.

Figure 4:
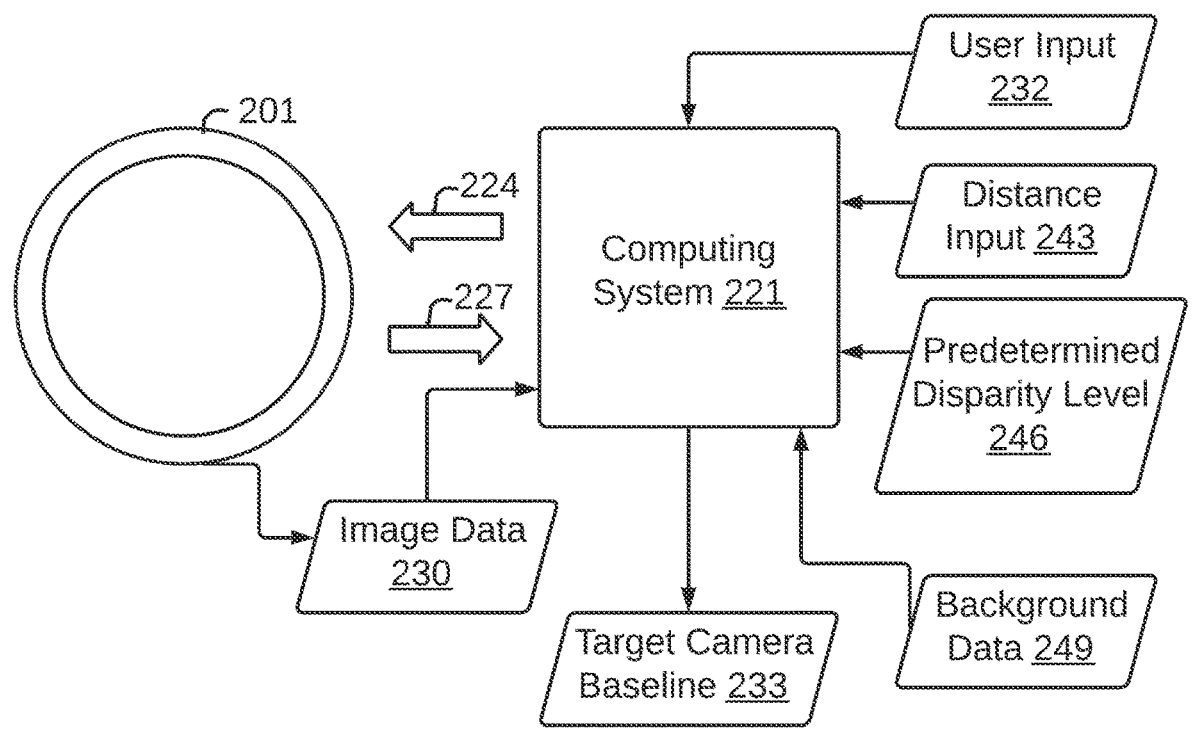
FIG. 4 illustrates a computing system coupled to a camera system of a multiview image capture system, according to an embodiment consistent with the principles described herein.

FIG. 4 illustrates a computing system 221 coupled to a camera system 201 of a multiview image capture system, according to an embodiment consistent with the principles described herein. The computing system 221 may be a processor-based system that receives input, executes program instruction, and generates output. An example of the computing system 221 is described in more detail with respect to FIG. 11. FIG. 4 shows a computing system 221 coupled to the camera system 201 using a wired connection or a wireless connection. The computing system 221 may transmit control signals 224 to the camera system 201. Control signals 224 may include commands that control or configure the cameras of the camera system 201. For example, the control signals 224 may be commands to cause the camera system 201 to move its cameras, zoom in, zoom out, adjust the field of view, select a subset of cameras for image capture, deselect some cameras, begin recording, stop recording, or other commands to control the cameras and set visual parameters.

The computing system 221 may also receive feedback signals 227 from the camera system 201. Feedback signals 227 may include the visual parameters of the cameras (e.g., FoV, focal length, distance between the cameras and the object), camera positions, the statuses of the cameras, or other information relating to the camera system 201. In some embodiments, the multiview capture system may include a sensor configured to measure the common distance between the object and each of the cameras of the subset of cameras to generate the second value. The sensor may be a distance sensor attached to one or more cameras. The feedback signals 227 may include the second value indicating the common distance as measured by the sensor.

The camera system 201 may also capture image data 230 of an object and transmit the image data 230 to the camera system 201. The image data 230 contains different view images of the object and may be formatted as a multiview image that represents a video frame or static image. The multiview image comprises a plurality of different view images of the object. The computing system 221 may receive the image data 230 and store it in memory. The computing system 221 may also process the image data 230 and stream it as live multiview video to a multiview display device for rendering in real time. For example, the multiview image may be converted into a frame made up of tiles, where each tile represents a different view image.

Thus, according to embodiments, the computing system 221 is configured to receive a first value indicating the common field of view and a second value indicating the common distance. The first value or second value may be part of the feedback signal 227 or may be received by accessing the memory of the computing system 221. For example, a photographer may specify a FoV value (or a focal length or other equivalent indicating a FoV) for the camera system 201 as a user input 232. The photographer may configure each camera with a common FoV and provide the common FoV as first value that is an input into the computing system 221. In this respect, the camera system 201 may have its cameras configured to adopt the user-specified FoV and the user-specified FoV may be received by the computing system 221 as a first value as part of a calculation to determine a target camera baseline 233.

The second value indicating the common distance may be received as a distance input 243 provided to the computing system 221. The distance input 243 may be user-specified or automatically determined by a sensor that is configured to measure the distance between the object being captured and the cameras of the camera system 201.

According to embodiments, the computing system 221 is configured to calculate a target camera baseline 233 based on the first value indicating the common FoV and the second value indicating the common distance. For example, the distance input 243 and FoV may be used to determine an optimal target camera baseline 233. The target camera baseline 233 is a value that indicates the distance between two perspectives (e.g., camera positions) providing corresponding views. A larger target camera baseline 233 provides more disparity between the different views. When the target camera baseline 233 is zero, the multiview image collapses into a single view image as there is no disparity between the views.

In some embodiments, the target camera baseline 233 is further calculated to achieve a predetermined disparity level. The predetermined disparity level 246 may be a value that specifies a desired amount of disparity for a target multiview display. The multiview display may be similar to the multiview display 112 of FIGS. 1 and 2. The predetermined disparity level 246 may be expressed as a percentage of the multiview display width between neighboring views. In this respect, the target camera baseline 233 can be calculated so that it is optimized for the disparity level of a particular multiview display. The predetermined disparity level 246 may be received as an input to the computing system 221 or otherwise stored in a memory of the computing system 221.

The target camera baseline 233 may be calculated such that it is proportional to the predetermined disparity level 246, proportional to the common distance, and inversely proportional to focal length f. As mentioned above, the focal length f may be converted from the FoV.

In some embodiments, the computing system 221 is further configured to determine a presence of an untextured background. The presence of an untextured background may be used to further define how the target camera baseline 233 is calculated. By definition herein, an 'untextured background' may be a background that is a monochromatic background, made up of a similar shade of color, or other background that lacks diverse visual features. For example, a green screen or blue screen may be an untextured background placed behind the object that is being captured. The presence of an untextured background may be provided as background data 249 supplied to the computing system 221 as an input. For example, a user may specify whether there is an untextured background added behind the object. The background data 249 may be a flag or binary indication of the presence of an untextured background. In some embodiments, the background data 249 may be a user-specified input. In other embodiments the presence of an untextured background may be automatically determined by a sensor. For example, a sensor may measure the degree of color variation of the background, which is then compared to a threshold to determine if it is textured or untextured.

In some embodiments, in response to the presence of an untextured background, the target camera baseline 233 is further calculated based on a scene depth. In this respect, in response to the presence of an untextured background, the target camera baseline is further calculated based on a distance between the subset of cameras and a front of the object and a distance between the subset of cameras and a back of the object.

The common distance (distance between the cameras and the object) may be further specified to contain or otherwise be derived from two different values where these two different values are Zmin and Zmax. Zmin is the minimum scene depth which is calculated by taking the distance between the cameras and the front of the object, and Zmax which is calculated by taking the distance between the cameras and the back of the object. Thus, the common distance may be Zmin, Zmax, or an average of the two. In response to the presence of an untextured background, the target camera baseline 233 may be calculated according to equation (2) as:

$$B = D \left( f * \left( \frac{1}{Zmin} - \frac{1}{Zmax} \right) \right) \tag{2}$$

where B is the target camera baseline 233, D is the predetermined disparity level, f is the focal length expressed as a percentage of the recorded plane width, Zmin as defined above, and Zmax as defined above. Zmin and Zmax maybe be determined by receiving user input indicates the distance between a camera and the front of the object (Zmin) and the distance between the camera and the back of the object. In other embodiments, sensors positioned around the object may measure Zmin and Zmax. For example, a ring of cameras surrounding the object may also contain sensors to measure the scene depth with respect to a camera or subset of cameras.

In some embodiments, in response to the presence of a textured background, the target camera baseline is further calculated according to equation (3) as:

$$B = D * d / f \tag{3}$$

where B is the target camera baseline 233, D is a predetermined disparity level, d is the common distance (e.g., distance between the cameras and the object), and f is the focal length expressed as a percentage of the recorded plane width. A textured background includes color variations or visual artifacts that are intended to be part of the scene or otherwise a subject of the scene. An untextured background, on the other hand, is intended to draw the attention of a viewer away from the background and towards the object.

Thus, the presence of a textured background or the presence of an untextured background controls how the calculated target camera baseline 233 by accounting for a scene depth calculation. As discussed above, the scene depth calculation is based on the change in depth between the front of the object and the back of the object relative to the subset of cameras.

Upon calculating target camera baseline 233, the computing system 221 may be further configured to dynamically adjust an inter-camera capture distance between cameras of a subset of the cameras to match the target camera baseline 233. The inter-camera capture distance is the distance between the perspectives of adjacent cameras. According to some embodiments, the inter-camera capture distance may be the physical distance between the center of adjacent camera lenses or an equivalent distance between each camera position. Upon calculating target camera baseline 233, the computing system 221 may generate a control signal to control the camera system 201 to reconfigure the cameras to achieve the target camera baseline 223.

As mentioned above, the inter-camera capture distance may be modified dynamically. As a photographer zooms in or out or changes the positioning of the object, or changes the focal length/FoV, or makes other similar modifications, an updated target camera baseline 233 may be calculated to be optimized for a particular multiview display. The inter-camera capture distance may be dynamically changed on the fly to provide a disparity level that is optimized for the multiview display as a photographer modifies various visual parameters (e.g., zoom, FoV, distance away from object, etc.).

A subset of cameras may be activated or otherwise selected for capturing multiview content of the object. For example, if the photographer desires to capture multiview content having four distinct views, then four different cameras may be selected to form a subset of cameras. The computing system 221 may select a number of cameras that corresponds to the number of views of a multiview image format. The multiview image format may define a particular number of views and may be specified by the multiview display. For multiview displays supporting a larger number of views, more cameras may be selected to capture multiview content.

Figure 5:
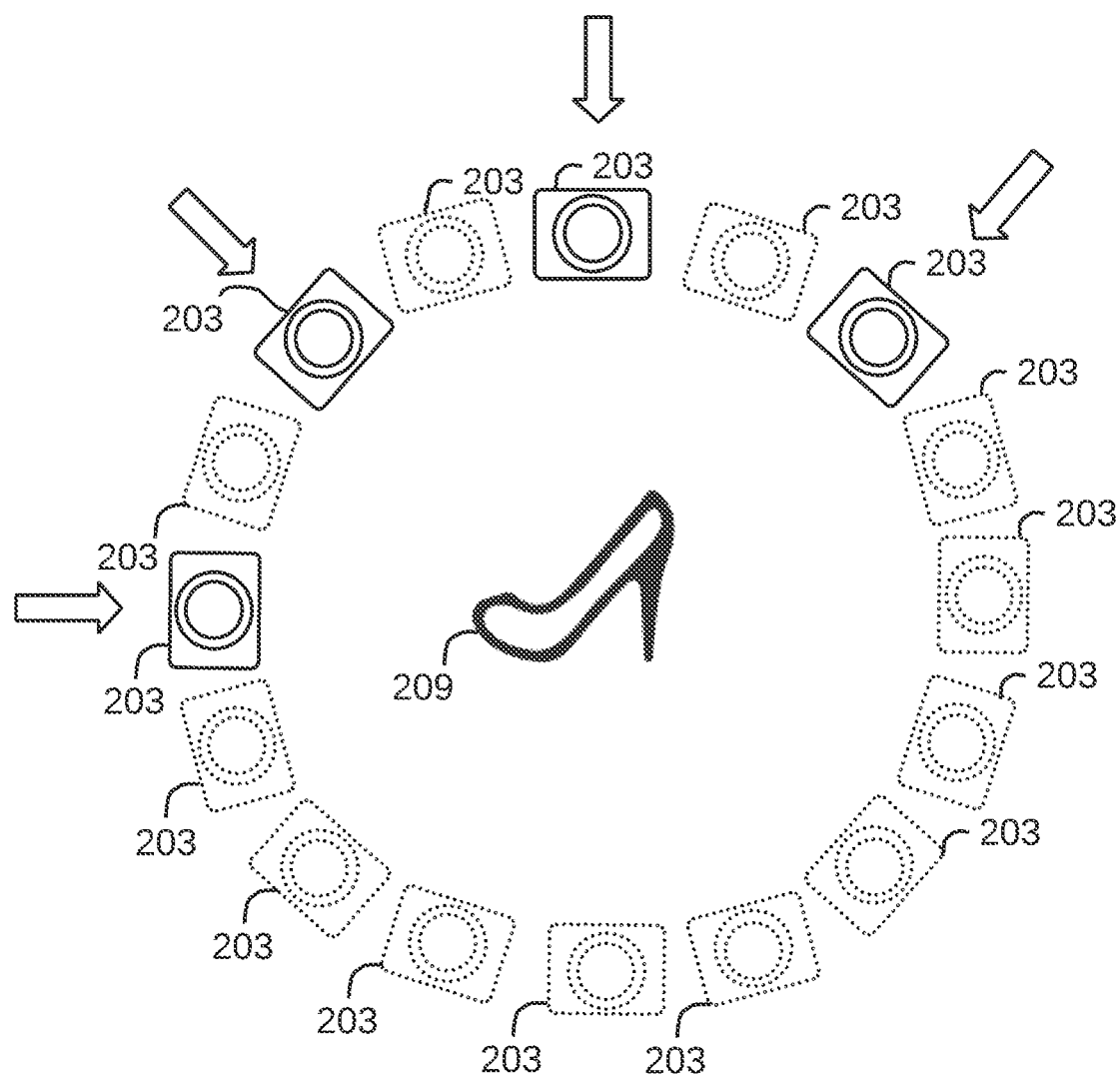
FIG. 5 illustrates an example of dynamic adjustment of an inter-camera capture distance by individually selecting a subset of cameras, according to an embodiment consistent with the principles described herein.

FIG. 5 illustrates an example of dynamic adjustment of an inter-camera capture distance by individually selecting a subset of the cameras 203, according to an embodiment consistent with the principles described herein. For example, the computing system 221 may be further configured to dynamically adjust the inter-camera capture distance by individually selecting the subset of the cameras 203 from the plurality of cameras 203. FIG. 5 shows an example where the multiview content that is captured has four views. Accordingly, four cameras 203 are selected by the computing system. Selected cameras 203 are shown in sold lines while cameras 203 that are unselected are shown in dotted lines. Each camera 203 may be selected by the computing system 221 using a camera identifier. The camera identifier allows the computing system 221 to individually select a specific camera to capture a view image of the object. The four cameras 203 are selected so that an inter-camera capture distance can be controlled such that it matches the target camera baseline. In this embodiment, each camera 203 may have a fixed position relative to the other cameras. As a result, the inter-camera capture distance is quantized where the cameras 203 are selected to match the target camera baseline as close as possible. The cameras 203 may have fixed positions that are close together to accommodate small adjustments in the inter-camera capture distance.

For example, if the calculated target camera baseline is to be reduced, cameras 203 that are close together may be selected. On the other hand, if the calculated target camera baseline is to be increased, the cameras 203 that are farther apart may be selected. In this example of FIG. 5, the inter-camera capture distance may correspond to the number of cameras in between selected cameras.

Figure 6:
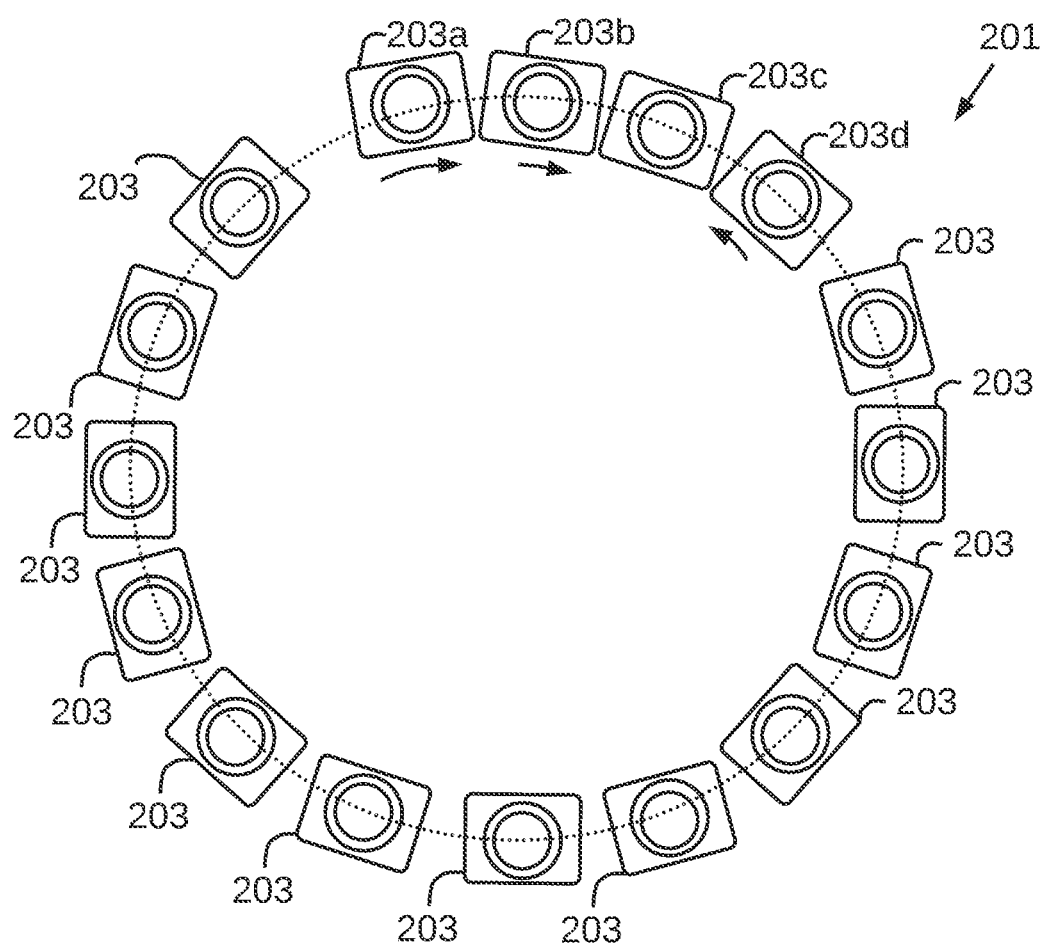
FIG. 6 illustrates an example of dynamic adjustment of an inter-camera capture distance by individually moving each camera among the subset of cameras along a track, according to an embodiment consistent with the principles described herein.

FIG. 6 illustrates an example of dynamic adjustment of an inter-camera capture distance by individually moving each camera among the subset of the cameras along a track, according to an embodiment consistent with the principles described herein. For example, FIG. 6 depicts an embodiment where the computing system is further configured to dynamically adjust the inter-camera capture distance by individually moving each camera among the subset of the cameras along a track. Cameras 203 may be individually selected and moved along a track that forms an arc. Cameras may move relative to one another. In this respect, each camera 203 may move individually towards or away from adjacent cameras 203. In addition, each camera 203 may move uniformly to maintain a similar baseline across the subset of cameras. This allows a photographer to apply an inter-camera capture distance across a subset of cameras 203a-d and have those cameras 203a-d orbit an object while maintaining the inter-camera capture distance.

FIG. 6 depicts an embodiment where one camera among the subset of cameras is designated as a center view camera. For example, the third camera 203c may be considered the center view camera. The cameras to the left and right of the center view camera 203c may move closer or farther away to achieve an inter-camera capture distance that matches a target camera baseline.

Figure 7:
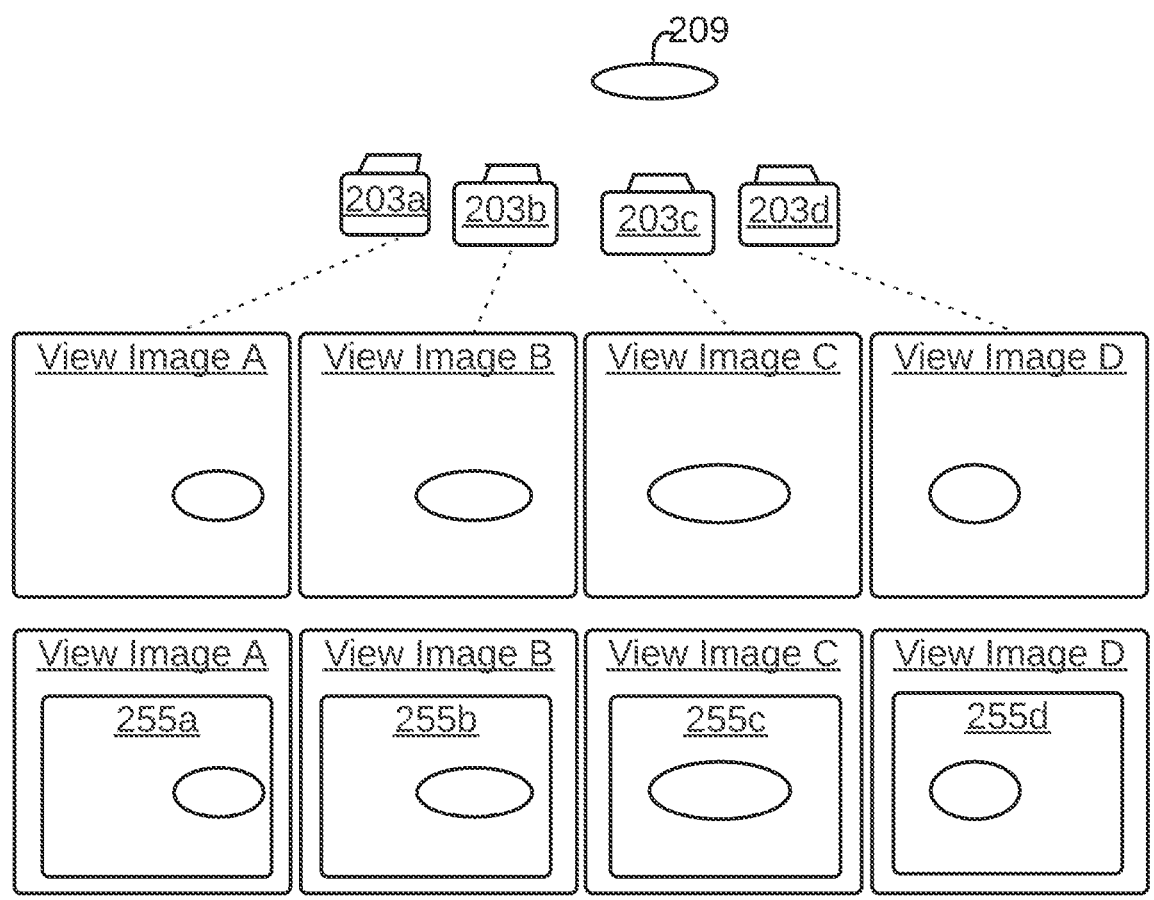
FIG. 7 illustrates an example of modifying the field of view by applying a cropping window to each view image, according to an embodiment consistent with the principles described herein.

FIG. 7 illustrates an example of modifying the field of view by applying a cropping window to each view image, according to an embodiment consistent with the principles described herein. For example, FIG. 7 depicts an embodiment where the computing system is further configured to modify the common field of view by applying a cropping window to view images provided by the subset of the cameras.

FIG. 7 shows four cameras 203a-d that are selected to capture multiview content of an object 209. A first camera 203a captures View Image A, a second camera 203b captures View Image B, a third camera 203c captures View Image C, and a fourth camera 203d captures View Image D. Each view image captured by the cameras 203a-d has a different perspective of the object 209 based on the position of the camera 203a-d.

A user may modify the field of view by providing user input that is received by the computing system. For example, the user may zoom in or zoom out. In response to the user input, the computing system may apply a cropping window 255a-d to a corresponding view image (e.g., View Image A-D). A smaller cropping window zooms in to effectively narrow the field of view while enlarging the cropping window zooms out to effectively widen the field of view. In this respect, a single user input to change the field of view causes the computing system to apply a cropping window 255a-d to each of the view images of the multiview image. In other words, the computing system globally applies a cropping windows 255a-d for each of the selected cameras to change the field of view according to the user input.

Figure 8:
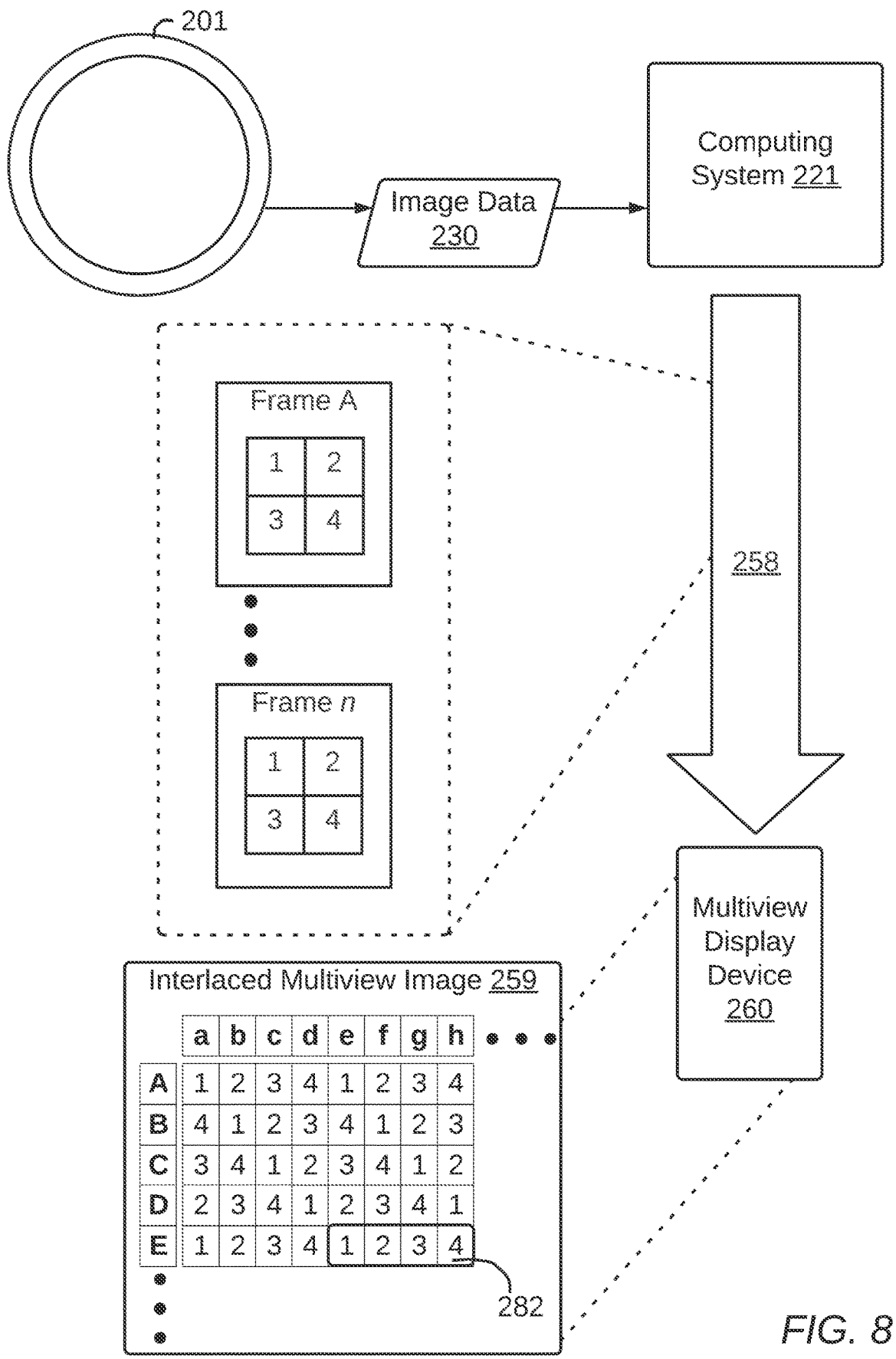
FIG. 8 illustrates an example of data multiview image being converted to a frame of a multiview video stream that is rendered by a multiview display device in real time, according to an embodiment consistent with the principles described herein.

FIG. 8 illustrates an example of data multiview image being converted to a multiview video stream that is rendered by a multiview display device, according to an embodiment consistent with the principles described herein. In some embodiments, the multiview video stream may be rendered in real time. For example, FIG. 8 illustrates a multiview image being converted to a frame of a multiview video stream that is rendered by a multiview display device in real time, wherein the frame is configured to be streamed to the multiview display device as a plurality of deinterlaced compressed view images. Image data 230 that comprises the multiview image is generated by the camera system 201 and transmitted to the computing system 221. The image data 230 may include view images obtained from the plurality of cameras of a subset of the plurality of cameras. The inter-camera capture distance may be dynamically modified in response to user input (e.g., zooming in, zooming out, changing the FoV, etc.) In response, additional image data 230 comprising additional multiview images is captured using the dynamically updated inter-camera capture distance.

The computing system 221 may generate a multiview video stream 258 by formatting the multiview images of the image data 230 into a plurality of tiled frames. FIG. 8 depicts tiled frames ranging from Frame A to Frame n. A tiled frame is a multiview frame where each multiview image of a particular tiled frame is positioned as a tile within the tiled frame. As a result, each multiview image (e.g., tile) in a tiled frame is spatially separated from other multiview images (e.g., tiles). The example of FIG. 8 shows a tiled frame having four views where view 1 is in the upper left quadrant, view 2 is in the upper right quadrant, view 3 is in the lower left quadrant, and view 4 is in the lower right quadrant.

The tiled multiview frames may be referred to as being deinterlaced. Interlacing is a process of spatially multiplexing pixels of each view image to form an interlaced multiview image 259. An interlaced multiview image 259 may represent a frame within a multiview video stream 258 where the tiled multiview frame is then interlaced to be rendered on a target multiview display device 260. The multiview display device 260 includes a multiview display such as, for example the multiview display 112 of FIGS. 1 and 2. The multiview display device 260 may be a computing system such as, for example, the computing system described in FIG. 11.

As shown in FIG. 8, the interlaced multiview image 259 has views that are spatially multiplexed or otherwise interlaced. The interlaced multiview image 259 contains an array of pixels, where each pixel corresponds to one of four views such that the pixels are interlaced (e.g., interleaved or spatially multiplexed). Pixels belonging to view 1 are represented by the number 1, pixels belonging to view 2 are represented by the number 2, pixels belonging to view 3 are represented by the number 3, and pixels belonging to view 4 are represented by the number 4. The views of the interlaced multiview image 259 are interlaced on a pixel-by-pixel basis, horizontally along each row. The interlaced multiview image 259 may be a pixel array having rows of pixels represented by uppercase letters A-E and columns of pixels represented by lowercase letters a-h. FIG. 8 shows the location of one of the multiview pixels 282 at row E, columns e-h. The multiview pixel 282 is an arrangement of pixels taken from pixels of each of the four views. In other words, the multiview pixel 282 is a result of interlacing the individual pixels of each of the four views so that they are spatially multiplexed. While FIG. 8 shows interlacing the pixels of the different views in the horizontal direction, the pixels of the different views may be interlaced in the vertical direction as well as in both the horizontal and vertical directions.

The interlaced multiview image 259 may result in a multiview pixel 282 having one pixel from each of the four views, assuming that the multiview image format specifies four views. In some embodiments, multiview pixels may be staggered in a particular direction, as shown in FIG. 8, where the multiview pixels are aligned horizontally while being staggered vertically. In other embodiments, the multiview pixels may be staggered horizontally and aligned vertically. A particular manner in which the multiview pixels are interlaced and staggered may depend on the design of the multiview display. The interlaced multiview image 259 may have its pixels interlaced and arranged into multiview pixels to allow them to be mapped to the physical pixels (e.g., light valve array) of the multiview display. In other words, the pixel coordinates of the interlaced multiview image 259 correspond to physical locations of the multiview display. The multiview pixel 282 has a mapping to a specific set of light valves in the light valve array. The light valve array is controlled to modulate light according to the interlaced multiview image 259. The light valves of the light valve array may be, for example, liquid crystal light valves, electrophoretic light valves, light valves based on or employing electrowetting, or any combination thereof.

When generating the multiview video stream 258, the computing system 221 may convert the multiview image into a plurality of deinterlaced compressed view images. The multiview video stream 258 may include tiled multiview frames that are compressed by applying a compression process. Compression refers to a process that reduces the size (in terms of bits) of the video data while maintaining a minimum amount of video quality. Without compression, the time it takes to completely stream video increases or otherwise strains network bandwidth. Video compression may, therefore, allow for reduced video stream data to support real-time video streaming, faster video streaming, or reduced buffering of an incoming video stream. Compression may be a lossy compression, meaning that the compression and decompression of the input data causes some loss in quality. The compressed video may be generated using a video encoder (e.g., compressor) (e.g., Coder Decoder (CODEC)) that conforms to a compression specification such as, for example, H.264 or any other CODEC specification. Compression may involve the generation of converting a series of frames into I-frames, P-frames, and B-frames as defined by the CODEC.

The multiview display device 260 may be configured to receive the multiview video stream 258 (e.g., comprising deinterlaced, compressed views). Thereafter, the multiview display device 260 may decompress the multiview video stream 258 using a CODEC, for example. The multiview display device 260 may interlace each view image of a frame to generate an interlaced multiview image 259. More efficient compression may be realized by compressing the tiled frames rather than compressing the interlaced multiview image. As a result, the multiview display device 260 may perform the interlacing rather than the computing system 221 performing the interlacing.

Figure 9:
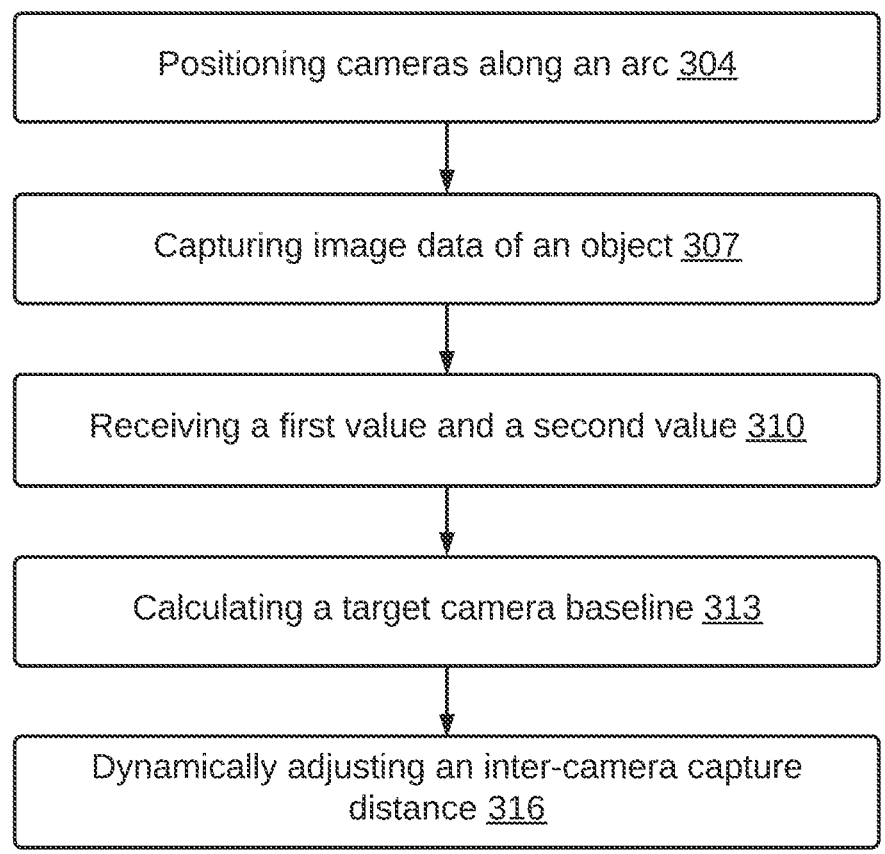
FIG. 9 is a flowchart that provides an example of multiview image capture, according to an embodiment consistent with the principles described herein.

FIG. 9 is a flowchart that provides an example of multiview image capture, according to an embodiment consistent with the principles described herein. The flowchart of FIG. 9 provides one example of operating a multiview image capture system, where the multiview image capture system includes a processor that executes an instruction set to perform some of the operations.

In some embodiments, multiview image capture comprises positioning 304 cameras along an arc. For example, the multiview image capture comprises positioning a plurality of cameras along an arc, the plurality of cameras having a coplanar orientation, each camera having a common field of view. In some embodiments, cameras may be affixed to a rigid, circular support so that they face towards an object of interest. The circular or arc-orientation allows each camera to have a common distance to the object. An example of this positioning of cameras is shown in FIGS. 3A and 3B.

In some embodiments, the multiview image capture comprises rotating the plurality of cameras to cause the plurality of cameras to uniformly orbit along the arc around the object. Photographers may cause a subset of the plurality of cameras to rotate along the arc around the object to provide new views of the object while maintaining a constant inter-camera capture distance. Each camera may be attached to a circular support member that slides along a track to allow multiple cameras to uniformly orbit around the object.

In some embodiments, multiview image capture comprises capturing 307 multiview image of an object. For example, this may involve capturing data multiview image of an object located at a common distance away from a subset of the cameras. Each camera may digitally record the object from the perspective of the camera, thereby creating a view image at a particular point in time. The view images across multiple cameras at a particular point in time result in a multiview image of the object. The multiview images that are captured may be transmitted to a computing system to be processed and then streamed or stored.

In some embodiments, multiview image capture comprises receiving 310 a first value and a second value. For example, this may involve receiving a first value indicating the common field of view and a second value indicating the common distance. A computing system may receive the first and second value as inputs that may be specified by a user or may be received by accessing memory that stores the first and second value.

In some embodiments, multiview image capture comprises calculating 313 a target camera baseline. For example, this may involve calculating a target camera baseline based on the first value and the second value. A computing system may receive the first and second value as inputs and generate a target camera baseline using one or more of equation (1), equation (2), and equation (3) discussed above.

In some embodiments, multiview image capture further comprises calculating the target camera baseline to achieve a predetermined disparity level. For example, as an additional input, a computing system may receive a predetermined disparity level that represents an optimal disparity level for a particular multiview display. The target camera baseline calculation therefore results in a target camera baseline that is optimized for a particular multiview display as different multiview displays may be designed to comfortably accommodate different levels of disparity. In some embodiments, the multiview image capture system further comprises calculating the target camera baseline based on the scene depth when there is an untextured background. The presence of untextured background creates a minimum and maximum depth associated with the multiview image. That is, when using an untextured background, the relevant portion of the scene is limited to the object and accordingly, a scene depth may be determined and then used to calculate a target camera baseline.

In some embodiments, multiview image capture comprises dynamically adjusting 316 an inter-camera capture distance. For example, this may involve dynamically adjusting an inter-camera capture distance between cameras of the subset of the cameras to match the target camera baseline. A computing system that calculates a target camera baseline may then control a camera system to implement the target camera baseline by transmitting control signals to cause the camera system to capture multiview content according to an inter-camera capture distance that matches the target camera baseline. Dynamically adjusting the inter-camera capture distance may comprise performing one or more of selecting the subset of the cameras from the plurality of cameras and individually moving each camera among the subset of the cameras along a track.

The captured multiview image may be stored for processing and rendering at a later point in time. Alternatively, multiview image capture may comprise streaming the multiview image to a multiview display device in real time as a plurality of deinterlaced compressed view images. An example of this is discussed above with respect to FIG. 8. A computing system may convert the multiview images into tiled multiview frames that are compressed and streamed to a multiview display device in real time. The multiview display device may decompress and interlace the tiled frames to render the streamed video content in real time.

The flowchart of FIG. 9 discussed above may illustrate a system or method of multiview image capture. If embodied in software and if applicable, boxes may represent a module, segment, or portion of code that comprises instructions to implement the specified logical function(s). The instructions may be embodied in the form of source code that comprises human-readable statements written in a programming language, object code that is compiled from source code, or machine code that comprises numerical instructions recognizable by a suitable execution system, such as a processor a computing device. The machine code may be converted from the source code, etc. If embodied in hardware, each block may represent a circuit or a number of interconnected circuits to implement the specified logical function(s).

Although the flowchart of FIG. 9 shows a specific order, it is understood that the order may differ from that which is depicted. For example, the order of two or more boxes may be scrambled relative to the order shown. Also, two or more boxes shown may be executed concurrently or with partial concurrence. Further, in some embodiments, one or more of the boxes may be skipped or omitted.

As discussed above, embodiments include a multiview image capture system comprising a camera system and a computing system. The camera system comprises at least one camera and is configured to capture images of an object at different locations along an arc, each image corresponding to a common field of view that includes the object. The image capture system also comprises a computing system coupled to the camera system. The computing system and camera system work together to generate multiview content that is optimized for a target multiview display by dynamically adjusting an inter-camera capture distance to accommodate a desired disparity level of the multiview display. In addition, the computing system may be configured to receive a first value indicating the common field of view and a second value indicating a distance between the camera system and the arc. The computing system may be configured to calculate a target camera baseline based on the first value indicating the common field and the second value indicating the common distance, the target camera baseline corresponding to a distance between the different locations along the arc. In addition, the computing system may be configured to dynamically adjust an inter-capture distance of the camera system to match the target camera baseline. As discussed above, in some embodiments the camera system comprises a plurality of cameras arranged along the arc, the plurality of cameras having a coplanar orientation. For example, a plurality of cameras may be attached to circular rigid support member.

Figure 10:
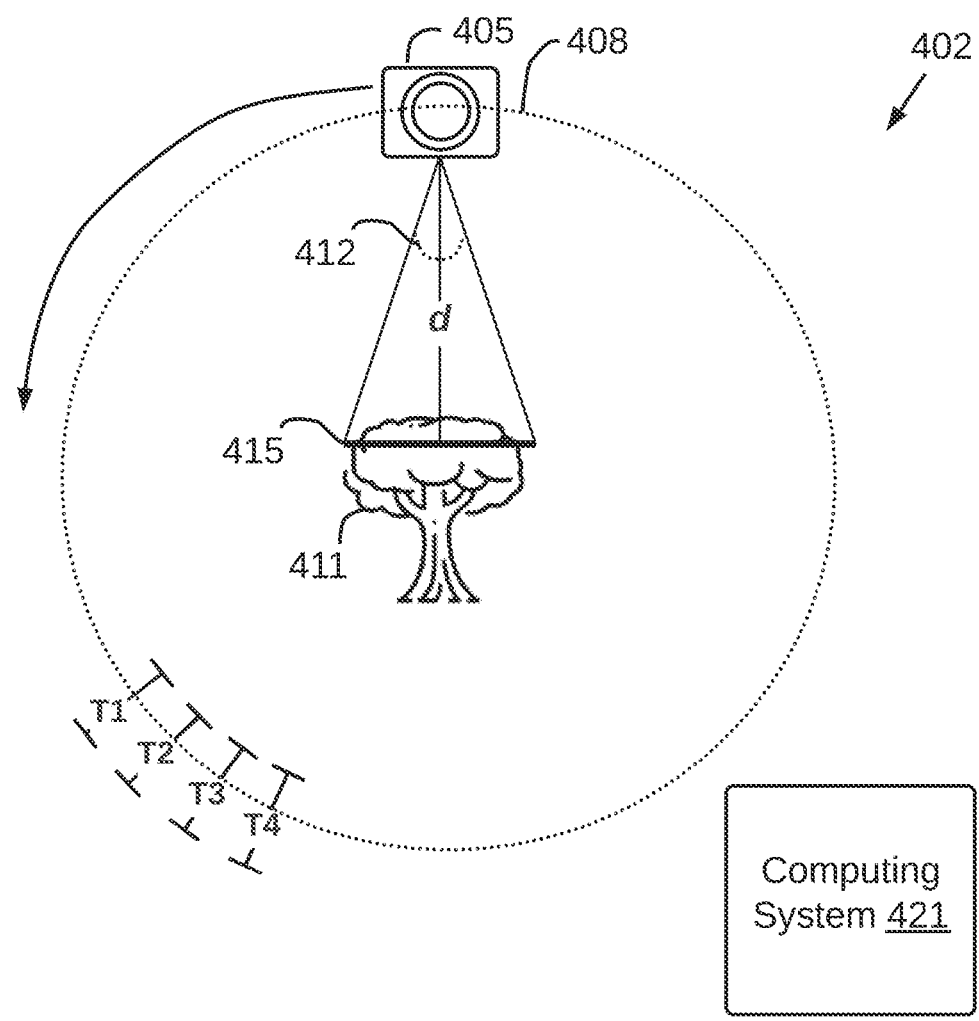
FIG. 10 illustrates an example of a multiview image capture system, wherein the camera system comprises an unmanned aerial vehicle, according to an embodiment consistent with the principles described herein.

In other embodiments, the camera system comprises an unmanned aerial vehicle configured to travel along the arc, the unmanned aerial vehicle comprising a sensor configured to measure the distance to generate the second value. For example, FIG. 10 illustrates an example of a multiview image capture system 402, wherein the camera system 405 comprises an unmanned aerial vehicle, according to an embodiment consistent with the principles described herein. The unmanned aerial vehicle may be a drone or other autonomous vehicle that is remotely controlled or programmatically controlled to move along an arc 408 to capture one or more multiview images of an object 411. The at least one camera may be attached to the unmanned aerial vehicle. As shown in FIG. 10, the camera system 405 is a single camera that moves along an arch (e.g., at least a portion of a circular path) in the counterclockwise direction. The camera system 405 may have a fixed or adjustable field of view (FoV) 412 to capture an object 411 that falls on the focal plane 415 of the camera system 405.

The camera system 405 may have a communication link with a computing system 421 that receives data multiview image and that may control the camera system 405. The computing system 421 may receive various inputs such as, for example, the FoV 412 (or focal length), the distance between the camera system 405 and the object 411, a predetermined disparity level for a multiview display, or other visual parameters relating to the object's position, view, degree of zoom, etc. In response, the computing system 421 may calculate a target camera baseline based on a first value indicating the common field and a second value indicating the common distance and dynamically adjust an inter-capture distance to match the target camera baseline.

In some embodiments, the computing system 421 is configured to dynamically adjust the inter-capture distance by determining a timestamp interval for each captured image. FIG. 10 shows timestamps (T1-T4) at different view images captured by the camera system 405. The timestamp interval may be expressed in terms of time or distance as the camera system 405 moves along the arc. The larger the timestamp interval, the larger the inter-capture distance. For example, four view images are captured at corresponding timestamps (T1-T4). These four view images make up a multiview image having a camera baseline defined by the time interval between successive timestamps.

Figure 11:
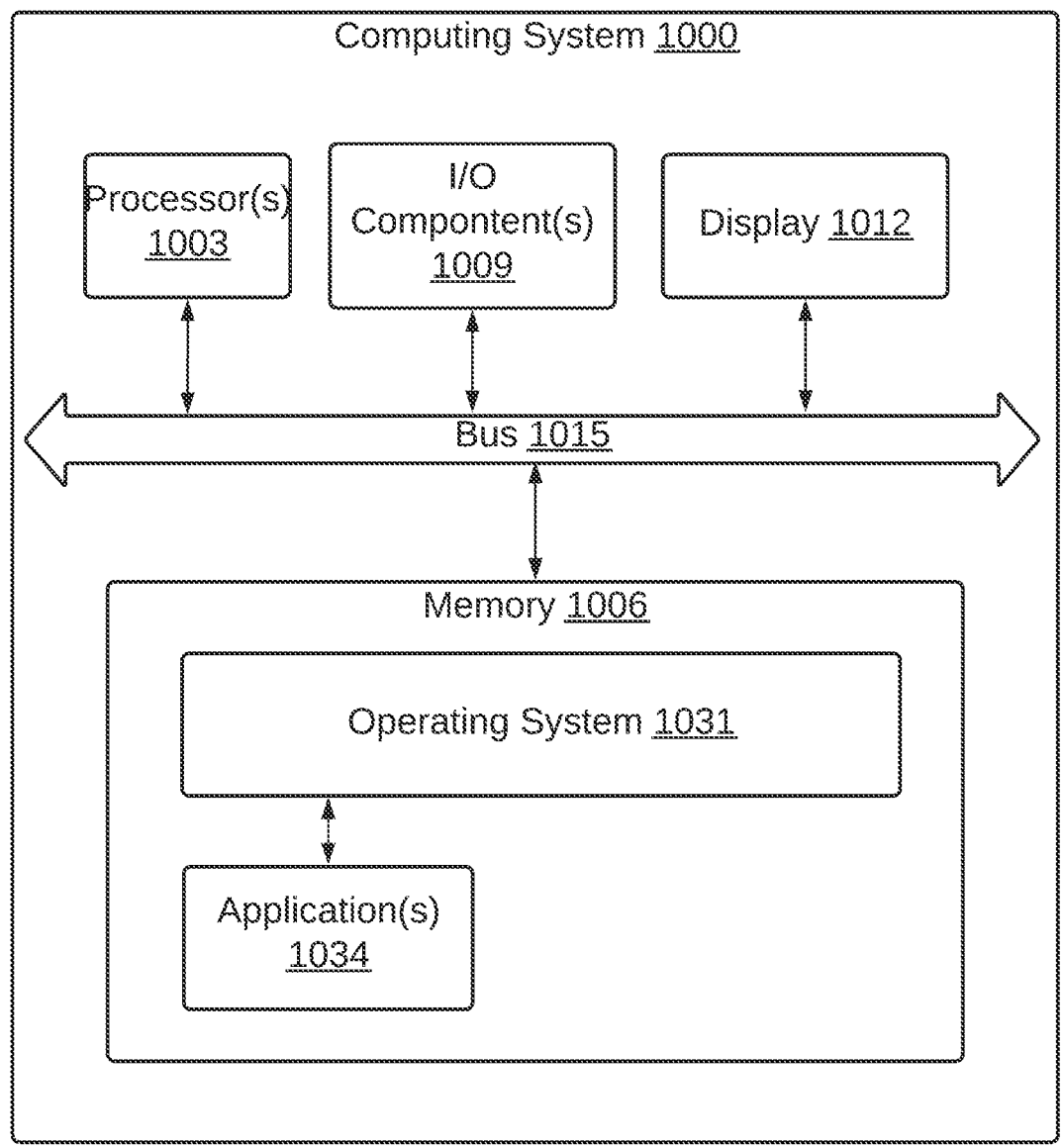
FIG. 11 is a schematic block diagram that depicts an example illustration of a computing system according to an embodiment consistent with the principles described herein.

FIG. 11 is a schematic block diagram that depicts an example illustration of a computing system according to an embodiment consistent with the principles described herein. The computing system 1000 may include a system of components that carry out various computing operations that receive multiview images, receive input values, calculate parameters for a camera system, generate control signals to control a camera system, process, and stream multiview images to multiview display devices. The computing system 1000 may be a laptop, tablet, smart phone, touch screen system, intelligent display system, or other client device. The computing system 1000 may include various components such as, for example, a processor(s) 1003, a memory 1006, input/output (I/O) component(s) 1009, a display 1012, and potentially other components. These components may couple to a bus 1015 that serves as a local interface to allow the components of the computing system 1000 to communicate with each other. While the components of the computing system 1000 are shown to be contained within the computing system 1000, it should be appreciated that at least some of the components may couple to the through an external connection. For example, components may externally plug into or otherwise connect with the computing system 1000 via external ports, sockets, plugs, wireless links, or connectors.

The computing system 1000 may implement the computing system 221 of FIGS. 4 and 8 as well as the computing system 421 of FIG. 10. In addition, in embodiments where the computing system 1000 includes a multiview display, the computing system 1000 may implement the multiview display device 260 of FIG. 8.

A processor 1003 may be a central processing unit (CPU), graphics processing unit (GPU), any other integrated circuit that performs computing processing operations, or any combination thereof. The processor(s) 1003 may include one or more processing cores. The processor(s) 1003 comprises circuitry that executes instructions. Instructions include, for example, computer code, programs, logic, or other machine-readable instructions that are received and executed by the processor(s) 1003 to carry out computing functionality that are embodied in the instructions. The processor(s) 1003 may execute instructions to operate on data. For example, the processor(s) 1003 may receive input data (e.g., data multiview image, a video stream, multiview content, user inputs, etc.), process the input data according to an instruction set, and generate output data (e.g., process multiview content for streaming, control signals, etc.). As another example, the processor(s) 1003 may receive instructions and generate new instructions for subsequent execution. The processor 1003 may comprise the hardware to implement a graphics pipeline for processing and rendering multiview content. For example, the processor(s) 1003 may comprise one or more GPU cores, vector processors, scaler processes, or hardware accelerators.

The memory 1006 may include one or more memory components. The memory 1006 is defined herein as including either or both of volatile and nonvolatile memory. Volatile memory components are those that do not retain information upon loss of power. Volatile memory may include, for example, random access memory (RAM), static random-access memory (SRAM), dynamic random-access memory (DRAM), magnetic random-access memory (MRAM), or other volatile memory structures. System memory (e.g., main memory, cache, etc.) may be implemented using volatile memory. System memory refers to fast memory that may temporarily store data or instructions for quick read and write access to assist the processor(s) 1003.

Nonvolatile memory components are those that retain information upon a loss of power. Nonvolatile memory includes read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive. The ROM may comprise, for example, a programmable read-only memory (PROM), an erasable programmable read-only memory (EPROM), an electrically erasable programmable read-only memory (EEPROM), or other like memory device. Storage memory may be implemented using nonvolatile memory to provide long term retention of data and instructions.

The memory 1006 may refer to the combination of volatile and nonvolatile memory used to store instructions as well as data. For example, data and instructions may be stored in nonvolatile memory and loaded into volatile memory for processing by the processor(s) 1003. The execution of instructions may include, for example, a compiled program that is translated into machine code in a format that can be loaded from nonvolatile memory into volatile memory and then run by the processor 1003, source code that is converted in suitable format such as object code that is capable of being loaded into volatile memory for execution by the processor 1003, or source code that is interpreted by another executable program to generate instructions in volatile memory and executed by the processor 1003, etc. Instructions may be stored or loaded in any portion or component of the memory 1006 including, for example, RAM, ROM, system memory, storage, or any combination thereof.

While the memory 1006 is shown as being separate from other components of the computing system 1000, it should be appreciated that the memory 1006 may be embedded or otherwise integrated, at least partially, into one or more components. For example, the processor(s) 1003 may include onboard memory registers or cache to perform processing operations. Device firmware or drivers may include instructions stored in dedicated memory devices.

I/O component(s) 1009 include, for example, touch screens, speakers, microphones, buttons, switches, dials, camera, sensors, accelerometers, or other components that receive user input or generate output directed to the user. I/O component(s) 1009 may receive user input and convert it into data for storage in the memory 1006 or for processing by the processor(s) 1003. I/O component(s) 1009 may receive data outputted by the memory 1006 or processor(s) 1003 and convert them into a format that is perceived by the user (e.g., sound, tactile responses, visual information, etc.).

A specific type of I/O component 1009 is a display 1012. The display 1012 may include a multiview display (e.g., multiview display 112), a multiview display combined with a 2D display, or any other display that presents images. A capacitive touch screen layer serving as an I/O component 1009 may be layered within the display to allow a user to provide input while contemporaneously perceiving visual output. The processor(s) 1003 may generate data that is formatted as an image for presentation on the display 1012. The processor(s) 1003 may execute instructions to render the image on the display for being perceived by the user.

The bus 1015 facilitates communication of instructions and data between the processor(s) 1003, the memory 1006, the I/O component(s) 1009, the display 1012, and any other components of the computing system 1000. The bus 1015 may include address translators, address decoders, fabric, conductive traces, conductive wires, ports, plugs, sockets, and other connectors to allow for the communication of data and instructions.

The instructions within the memory 1006 may be embodied in various forms in a manner that implements at least a portion of the software stack. For example, the instructions may be embodied as part of an operating system 1031, an application(s) 1034, a device driver, firmware, other software components, or any combination thereof. The operating system 1031 is a software platform that supports the basic functions of the computing system 1000, such as scheduling tasks, controlling I/O components 1009, providing access to hardware resources, managing power, and supporting applications 1034.

An application(s) 1034 executes on the operating system 1031 and may gain access to hardware resources of the computing system 1000 via the operating system 1031. In this respect, the execution of the application(s) 1034 is controlled, at least in part, by the operating system 1031. The application(s) 1034 may be a user-level software program that provides high-level functions, services, and other functionality to the user. In some embodiments, an application 1034 may be a dedicated 'app' downloadable or otherwise accessible to the user on the computing system 1000. The user may launch the application(s) 1034 via a user interface provided by the operating system 1031. The application(s) 1034 may be developed by developers and defined in various source code formats. The applications 1034 may be developed using a number of programming or scripting languages such as, for example, C, C++, C#, Objective C, Java®, Swift, JavaScript®, Perl, PUP, Visual Basic®, Python®, Ruby, Go, or other programming languages. The application(s) 1034 may be compiled by a compiler into object code or interpreted by an interpreter for execution by the processor(s) 1003. The application 1034 may implement at least some of the functionality discussed above. For example, an application 1034 may allow a user to control the camera system by providing various visual parameters.

The operating system 1031, application(s) 1034, drivers, firmware, and potentially other instruction sets may each comprise instructions that are executable by the processor(s) 1003 or other processing circuitry of the computing system 1000 to carry out at least some of the functionality and operations discussed above. Although the instructions described herein may be embodied in software or code executed by the processor(s) 1003 as discussed above, as an alternative, the instructions may also be embodied in dedicated hardware or a combination of software and dedicated hardware. For example, the functionality and operations carried out by the instructions discussed above may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

In some embodiments, the instructions that carry out the functionality and operations discussed above may be embodied in a non-transitory, computer-readable storage medium. The non-transitory, computer-readable storage medium may or may not be part of the computing system 1000. The instructions may include, for example, statements, code, or declarations that can be fetched from the computer-readable medium and executed by processing circuitry (e.g., the processor(s) 1003). Has defined herein, a 'non-transitory, computer-readable storage medium' is defined as any medium that can contain, store, or maintain the instructions described herein for use by or in connection with an instruction execution system, such as, for example, the computing system 1000, and further excludes transitory medium including, for example, carrier waves.

The non-transitory, computer-readable medium may comprise any one of many physical media such as, for example, magnetic, optical, or semiconductor media. More specific examples of a suitable non-transitory, computer-readable medium may include, but are not limited to, magnetic tapes, magnetic floppy diskettes, magnetic hard drives, memory cards, solid-state drives, USB flash drives, or optical discs. Also, the non-transitory, computer-readable medium may be a random-access memory (RAM) including, for example, static random-access memory (SRAM) and dynamic random-access memory (DRAM), or magnetic random-access memory (MRAM). In addition, the non-transitory, computer-readable medium may be a read-only memory (ROM), a programmable read-only memory (PROM), an erasable programmable read-only memory (EPROM), an electrically erasable programmable read-only memory (EEPROM), or other type of memory device.

The computing system 1000 may perform any of the operations or implement the functionality described above. For example, the process flows discussed above may be performed by the computing system 1000 that executes instructions and processes data. While the computing system 1000 is shown as a single device, embodiments are not so limited. In some embodiments, the computing system 1000 may offload processing of instructions in a distributed manner such that a plurality of computing systems 1000 or other computing devices operate together to execute instructions that may be stored or loaded in a distributed arranged. For example, at least some instructions or data may be stored, loaded, or executed in a cloud-based system that operates in conjunction with the computing system 1000.

Thus, there have been described examples and embodiments of a multiview capture system and a method of capturing a multiview image. A camera system may capture various views of an object while having its inter-capture distance dynamically modified to accommodate a predetermined disparity level while a photographer changes various visual parameters. In this respect, the multiview content generated by the camera system is optimized to achieve a particular disparity level for a target multiview display. Photographers are free to modify parameters such as, for example, field of view, focal length, zoom, etc. while ensuring that a rendering of the captured multiview content achieves a predetermined disparity level. Clearly, those skilled in the art can readily devise numerous other arrangements without departing from the scope as defined by the following claims.

What is claimed is:

1. A multiview image capture system comprising:
   a camera system comprising a plurality of cameras arranged along an arc, the plurality of cameras having a coplanar orientation, each camera of the plurality of cameras having a common field of view, wherein the camera system is configured to capture a multiview image of an object located at a common distance away from each of the cameras, the multiview image comprising a plurality of different view images of the object; and
   a computing system coupled to the camera system, the computing system being configured to:
   calculate a target camera baseline based on a first value indicating the common field of view and a second value indicating the common distance; and
   dynamically adjust an inter-camera capture distance between cameras of a subset of the cameras to match the target camera baseline.

2. The multiview image capture system of claim 1, further comprising:
   a sensor configured to measure the common distance between the object and each of the cameras of the subset of the cameras to generate the second value.

3. The multiview image capture system of claim 1, wherein each camera is attached to a rotatable support member, the rotatable support member configured to cause the plurality of cameras to uniformly orbit along the arc around the object.

4. The multiview image capture system of claim 1, wherein the target camera baseline is further calculated to achieve a predetermined disparity level.

5. The multiview image capture system of claim 4, wherein the computing system is further configured to determine a presence of an untextured background.

6. The multiview image capture system of claim 5, wherein, in response to the presence of an untextured background, the target camera baseline is further calculated based on a distance between the subset of the cameras and a front of the object and a distance between the subset of the cameras and a back of the object.

7. The multiview image capture system of claim 1, wherein the computing system is further configured to dynamically adjust the inter-camera capture distance by individually selecting cameras of the subset of the cameras from the plurality of cameras.

8. The multiview image capture system of claim 1, wherein the computing system is further configured to modify the common field of view by applying a cropping window to view images provided by the subset of the cameras.

9. The multiview image capture system of claim 1, wherein the computing system is further configured to dynamically adjust the inter-camera capture distance by individually moving each camera among the subset of the cameras along a track.

10. The multiview image capture system of claim 1, wherein the multiview image is converted to a frame of a multiview video stream that is rendered by a multiview display device in real time, wherein the frame is configured to be streamed to the multiview display device as a plurality of deinterlaced compressed view images.

11. A method of multiview image capture, the method comprising:
    positioning a plurality of cameras along an arc, the plurality of cameras being coplanar, each camera of the plurality of cameras having a common field of view;
    capturing a multiview image of an object using a subset of cameras of the plurality of cameras, the multiview image comprising a plurality of different view images of the object, the object being located at a common distance away from the subset of cameras;
    receiving a first value indicating the common field of view and a second value indicating the common distance;
    calculating a target camera baseline based on the first value and the second value; and
    dynamically adjusting an inter-camera capture distance between cameras of the subset of cameras to match the target camera baseline.

12. The method of multiview image capture of claim 11, further comprising rotating the plurality of cameras to cause the plurality of cameras to uniformly orbit along the arc around the object.

13. The method of multiview image capture of claim 11, further comprising calculating the target camera baseline to achieve a predetermined disparity level.

14. The method of multiview image capture of claim 11, wherein, calculating the target camera baseline based on a distance between the subset of cameras and a front of the object and a distance between the subset of cameras and a back of the object.

15. The method of multiview image capture of claim 11, further comprising dynamically adjusting the inter-camera capture distance by performing one or more of:
  selecting the subset of cameras from the plurality of cameras; and
  individually moving each camera among the subset of cameras along a track.

16. The method of multiview image capture of claim 11, further comprising: streaming the multiview image to a multiview display device in real time as a plurality of deinterlaced compressed view images.

17. A multiview image capture system comprising:
  a camera system comprising at least one camera, the camera system configured to capture images of an object at different locations along an arc, each image corresponding to a common field of view that includes the object; and
  a computing system coupled to the camera system, the computing system being configured to:
    receive a first value indicating the common field of view and a second value indicating a distance between the arc and the object;
    calculate a target camera baseline based on the first value and the second value, the target camera baseline corresponding to a distance between the different locations along the arc; and
    dynamically adjust an inter-capture distance of the camera system to match the target camera baseline.

18. The multiview image capture system of claim 17, wherein the camera system comprises a plurality of cameras arranged along the arc, the plurality of cameras having a coplanar orientation.

19. The multiview image capture system of claim 17, wherein the camera system comprises an unmanned aerial vehicle configured to travel along the arc, the unmanned aerial vehicle comprising a sensor configured to measure the distance to generate the second value, the at least one camera being attached to the unmanned aerial vehicle.

20. The multiview image capture system of claim 19, wherein the computing system is configured to dynamically adjust the inter-capture distance by determining a timestamp interval for each captured image.

* * * * *